US012364212B1

(12) United States Patent
 Cordani

(10) Patent No.: US 12,364,212 B1
(45) Date of Patent: Jul. 22, 2025

(54) METHOD OF MODIFYING WEATHER WITH ALTITUDE TARGETING DROP BAGS

(71) Applicant: Peter Cordani, Jupiter, FL (US)

(72) Inventor: Peter Cordani, Jupiter, FL (US)

(73) Assignee: Peter Cordani, Jupiter, FL (US)

(*) Notice: Subject to any disclaimer, the term of this patent is extended or adjusted under 35 U.S.C. 154(b) by 502 days.

(21) Appl. No.: 17/354,014

(22) Filed: Jun. 22, 2021

Related U.S. Application Data

(60) Provisional application No. 63/047,441, filed on Jul. 2, 2020.

(51) Int. Cl.
 *A01G 15/00* (2006.01)
 *B01J 20/26* (2006.01)
 *B64D 1/16* (2006.01)

(52) U.S. Cl.
 CPC ............ *A01G 15/00* (2013.01); *B01J 20/267* (2013.01); *B64D 1/16* (2013.01)

(58) Field of Classification Search
 CPC ..... A62C 3/0228; A62C 3/0235; A62C 3/025; B64D 1/16
 USPC .............. 239/2.1, 12.1, 171; 169/34–36, 53; 244/136
 See application file for complete search history.

(56) References Cited

U.S. PATENT DOCUMENTS

| | | | |
|---|---|---|---|
| 2,359,573 A * | 10/1944 | Mackay | B64D 1/16 169/53 |
| 2,895,693 A * | 7/1959 | Portias | B64D 1/16 244/136 |
| 4,096,005 A | 6/1978 | Slusher | |
| 4,600,147 A | 7/1986 | Fukuta et al. | |
| 5,174,498 A | 12/1992 | Popovitz-Biro et al. | |
| 5,357,865 A | 10/1994 | Mather | |
| 6,315,213 B1 | 11/2001 | Cordani | |
| 10,314,249 B2 | 6/2019 | Wilkins | |
| 2007/0090174 A1* | 4/2007 | Goddard | A62C 3/0235 169/34 |
| 2011/0133036 A1* | 6/2011 | Goddard | B64D 17/02 244/137.3 |
| 2013/0206912 A1 | 8/2013 | Bright | |
| 2017/0333740 A1* | 11/2017 | Church | A62C 3/04 |

* cited by examiner

*Primary Examiner* — Steven J Ganey
(74) *Attorney, Agent, or Firm* — McHale & Slavin, P.A.

(57) ABSTRACT

A method of modifying weather by seeding storm clouds at various altitudes with a polymer. The storm clouds are seeded by dispersing a superabsorbent polymer into the cloud in sufficient quantities to cause a large absorption of water. The reaction of the water with the polymer creates a gel-like substance that precipitates to the surface, thus causing an internal constriction within the cloud to lessen storm velocities. The polymer is placed in drop bags and dispensed from an airplane at predetermined altitudes.

10 Claims, No Drawings

METHOD OF MODIFYING WEATHER WITH ALTITUDE TARGETING DROP BAGS

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 63/047,441 entitled "METHOD OF MODIFYING WEATHER WITH ALTITUDE TARGETING DROP BAGS", filed Jul. 2, 2020. The contents of which the above referenced application is incorporated herein by reference.

FIELD OF THE INVENTION

This invention relates generally to weather modification; and in particular, to the use of polymers dispensed at predetermined altitudes to absorb aqueous solutions capable of modifying a weather situation.

BACKGROUND OF THE INVENTION

It is well known that hurricanes, tropical storms, typhoons, and the like weather patterns can cause severe damage to land, buildings, and living creatures. The resulting damage from even an isolated event can be billions of dollars. For instance, Hurricane Andrew cost $27 billion in damages, which in 1992 was considered one of the costliest storms to strike the United States. Since then, Hurricane Katrina in 2005 caused $125 billion in damages; Hurricane Wilma in 2005 caused $27 billion in damages; Hurricane Ike in 2008 caused $38 billion in damages; Hurricane Sandy in 2012 caused $68 billion in damages; Hurricane Irma in 2017 caused $77 billion in damages; Hurricane Maria in 2017 caused $90 billion in damages; and Hurricane Harvey in 2017 caused $125 billion in damages.

Cloud seeding is a known process for artificially modifying the weather by injecting a composition into a cloud for formation of an ice freezing nuclei. Silver iodide is a well-known substance used for cloud seeding. Ice freezing nuclei have the effect of creating rain, reducing hail, and possibly preventing rain by overseeding.

U.S. Pat. No. 6,315,213 discloses a method for artificially modifying the weather by seeding rain clouds of a storm with suitable cross-linked aqueous polymer. The polymer is dispersed into the cloud and the wind of the storm agitates the mixture, causing the polymer to absorb the rain. This reaction forms a gelatinous substance which precipitates to the surface below. Thus, diminishing the cloud's ability to rain.

U.S. Pat. No. 10,314,249 discloses a system for use in inducing rainfall. The system includes an aircraft configured to travel through an ambient environment at a first temperature, and a precipitation system coupled to the aircraft. The precipitation system is configured to form a particle from a substance in the ambient environment, and is configured to discharge the particle at a second temperature which is lower than the first temperature, such that moisture in the air condenses on the particle.

U.S. Patent Publication No. 2013/0206912 discloses a method of reducing the amount of water in a region of air including: forming seed ice crystals; dispensing the seed ice crystals towards the region of air; allowing water in the region of air to freeze or deposit onto the seed ice crystals; and allowing the resulting ice crystals to move from the region of air so as to reduce the amount of water in the region of air. An ice crystal seeding assembly is arranged to reduce the amount of water in a region of air. The seeding assembly includes an ice crystal seeder and dispensing means, the dispensing means being arranged to dispense seeded ice crystals towards the region of air so that water in the region of air freezes or deposits onto the seed ice crystals and the resulting ice crystals move from the region of air.

U.S. Pat. No. 5,174,498 discloses a cloud seeding material useful for seeding supercooled clouds in order to augment rainfall. The material used in seeding is defined as a aliphatic long-chain alcohol.

U.S. Pat. No. 4,600,147 discloses a cloud seeding method of inserting liquid propane from a rocket. The liquid propane is used to generate large numbers of ice crystals in supercooled clouds.

U.S. Pat. No. 5,357,865 discloses yet another method of cloud seeding. This invention includes the use of a pyrotechnic composition, such as potassium chlorate or potassium perchlorate, which acts as nuclei for precipitable water drop formation.

U.S. Pat. No. 4,096,005 discloses a pyrotechnic cloud seeding composition comprising silver iodate and a fuel consisting of aluminum and magnesium.

A problem with known seeding is that the interaction of the material and water occurs the moment the material contacts moisture in the atmosphere. For proper dispersement of the seeding materials, the materials need to be positioned at various altitudes. Unfortunately, that requires the use of rockets or airplanes to be placed at predetermined altitudes. The use of a rocket for delivery can result in damage should the empty shell return to earth improperly. Dispersement of material by an airplane would require the plane to fly at different altitudes, exposing the aircraft and crew to unpredictable conditions. On the average, the temperature drop for every 1,000 feet of altitude is 3.5 degrees Fahrenheit. If the cloud seeding is only performed along the tops of the clouds, the material will be immediately activated upon encountering moisture.

Thus, the prior art teachings are directed to methods of creating rain. What is lacking in the art is a method of lessening the wind velocities of a storm by placement of material at predetermined altitudes.

SUMMARY OF THE INVENTION

The instant application discloses a method of modifying weather by seeding storm clouds at various altitudes with a polymer. The storm clouds are seeded by dispersing a superabsorbent polymer into the cloud in sufficient quantities to cause a large absorption of water. The reaction of the water with the polymer creates a gel-like substance that precipitates to the surface, thus causing an internal constriction within the cloud to lessen storm velocities.

Accordingly, it is an objective of the instant invention to present a method for artificially modifying weather wherein a polymer is placed at different altitudes to allow wind dissipation by weighting condensation with the clouds.

It is another objective of the instant invention to present a method for seeding a rain cloud with cross-linked polymer packages in various wrappings, each designed to disintegrate, thereby releasing the polymer at predetermined temperatures, whereby the wind of the storm provides the agitation for the reaction of the polymer with the water.

Another objective of the invention is to teach the use of packaged polymers that can be distributed at a safe altitude for the protection of the aircraft and aircraft crew.

It is an additional objective of the instant invention to present a method for modifying storms such that the solid end product is biodegradable and nonhazardous.

Still another objective of the invention is to provide a package for the polymers that houses from 250 to 2,000 lbs. of dry polymer, the package providing a barrier to carbon dioxide, hydrogen and oxygen to preserve the life of the polymer.

Other objectives and advantages of this invention will become apparent from the following description wherein are set forth, by way of example, certain embodiments of this invention.

BRIEF DESCRIPTION OF THE FIGURES

No drawings provided.

DETAILED DESCRIPTION OF THE INVENTION

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

The present invention relates to a method for artificially modifying weather by solidifying portions of a cloud in a storm such as a hurricane, by introducing polymers into the cloud. This method utilizes "superabsorbent" aqueous based polymers, preferably cross-linked modified polyacrylamides which can be used in any application where aqueous solidification is permissible.

A superabsorbent polymer is a resin capable of absorbing water up to several thousands times its own weight. These superabsorbent polymers are prepared from water-soluble polymers, but have cross-linking structures which render the polymers water-insoluble. By taking water-soluble ethylenically unsaturated monomers which readily undergo vinyl polymerization, such as acrylamide, with the use of cross-linking agents, a polymer can be produced that is of uniform small size, has a high gel capacity, is highly insoluble, but highly water swellable, i.e. a superabsorbent polymer. (Gel capacity refers to the property of the water swollen polymer to resist viscosity changes as a result of mechanical working or milling.)

Superabsorbent polymers can be dehydrated to a powder. When the powder is added to an aqueous solution and agitated, the polymer is able to absorb many times its weight of the water molecules, and a gel-like substance is formed. Superabsorbent polymers are particularly suited for uses where rapid absorption of aqueous fluid is desired or for uses where the swelling properties in water are employed.

In the present invention, a solid form of the superabsorbent polymer, such as a powder, is introduced into the rain clouds of a storm at predetermined altitudes; for instance, an aircraft may traverse the storm and release the polymer seeds at a safe altitude for the aircraft. The amount of polymer needed is predetermined based upon the size and severity of the storm along with the absorption capacity of the polymer used. In the preferred embodiment, the method for artificially modifying weather by seeding a rain cloud comprises: forming an aqueous solidifier material capable of retaining over three hundred times its own weight in water, wherein said aqueous solidifier material is a cross-linked aqueous based polymer; storing a volume of said aqueous solidifier material in a water soluble film forming a drop bag; expelling said drop bag from an airplane at a first altitude; and dispersing said material into a suitable cloud formation upon breaching said drop bag at a second altitude, wherein the wind generated by the storm causes said solidifier to mix with rain to form a gel like substance; said gel like substance being of sufficient weight to precipitate to the surface below, thereby diminishing the velocity of the cloud.

The water soluble film is constructed from a copolymer polyvinyl alcohol (PVA) resin. The PVA resin is between 30 and 90 microns with a preferred embodiment of 40 microns. One grade of PVA resin can dissolve when exposed to 50° F. water in about 38-55 seconds and 68° F. water in about 29-40 seconds. A second grade of PVA resin can dissolve when exposed to 50° F. water in about 35-47 seconds and 68° F. water in about 25-35 seconds. A third grade of PVA resin can dissolve when exposed to 50° F. water in about 23-33 seconds and 68° F. water in about 19-26 seconds.

The PVA is formed into bag drops that hold the polymer in a dry state. An airplane used to dispense the bag drops can then fly at a first height while the bag drop allows dispersement of the material at a second height. The PVA can be chosen from a cold or warm water soluble grade. For assembly, the drop bag can be formed entirely from PVA and the material is heat sealable with a standard hot bar, impulse, or water and sonic sealing methods. PVA film barrier provides protection for the polymer, is solvent resistant, and oils will not migrate through the film. The PVA film also provides a barrier to carbon dioxide, hydrogen and oxygen.

Once the bag drop is deployed, the PVA will disintegrate at a predetermined altitude wind of the storm provides the agitation that causes the polymer to bind with the water, forming a gel-like substance. As a result of this method, wind based water storms can be artificially modified. The use of a biodegradable polymer allows for safe use of the ocean, wherein the high salinity of the water will expedite the degradation of the material. Various biodegradable super-absorbent polymers include carboxy-methylcellulose, alginic acid, cross-linked starches, cross-linked polyamino, acids and cross-linked modified polyacrylamides.

In a dry state, the preferred polymer may be considered a particle having a diameter less than 4000 microns but greater than 50 microns. In a swollen state, the particle may have a diameter greater than three hundred times its weight. In a totally water-swollen state, the particles contain up to about 99.98 weight percent of water and as little as about 0.1 weight percent of polymer. Thus, such particles could hold from ten to thousands of times their own weight. By seeding a leading edge of a violent storm, such as a hurricane, the winds cause a mix of the material wherein moisture is absorbed by the material, causing a shearing effect. The shearing effect causes the polymers to absorb, lose, and reabsorb water countless times. During this exchange, the weight of the water being transferred allows for wind shearing that assists in lessening the velocity of the wind.

The shearing forces are affected by the nature of the interactions between the particles during such collisions. When attractive forces dominate, the particles will aggregate and the dispersion may destabilize.

Example: A Hurricane is Seeded with Approximately 30,000 lbs. of a superabsorbent aqueous based polymer by use of a transport plane flying through the leading edge of the storm. Within twenty seconds, the polymer will obtain over 70 percent of its absorption capacity or nearly three hundred times its weight. The winds of the storm will continue to disperse the materials, causing a form of internal flocculation, disrupting the feeding nature of the storm. When presented close to land, the storm will not have sufficient time to reform to its previous strength.

All patents and publications mentioned in this specification are indicative of the levels of those skilled in the art to which the invention pertains. It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The use of the word "a" or "an" when used in conjunction with the term "comprising" in the claims and/or the specification may mean "one," but it is also consistent with the meaning of "one or more" or "at least one." The term "about" means, in general, the stated value plus or minus 5%. The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features.

Furthermore, a device or structure that is configured in a certain way is configured in at least that way, but may also be configured in ways that are not listed.

What is claimed is:

1. A method for artificially modifying weather by seeding a rain cloud comprising:

forming an aqueous solidifier material capable of retaining over three hundred times its own weight in water, wherein said aqueous solidifier material is a cross-linked aqueous based polymer;

storing a volume of said aqueous solidifier material in a water soluble film forming a plurality of drop bags;

dispensing said plurality of drop bags from an airplane at a first altitude into a storm cloud formation;

breaching of each said plurality of drop bags at predetermined altitudes lower than said first altitude, wherein wind within the storm cloud causes said aqueous solidifier material to be released from each said plurality of drop bags due to said breach to mix with rain to form a gel like substance, said gel like substance being of sufficient weight to precipitate to the surface below thereby diminishing the velocity of the storm cloud.

2. The method of claim 1 wherein said water soluble film is a copolymer PVA resin.

3. The method of claim 2 wherein said PVA resin is between 30 and 90 microns.

4. The method of claim 2 wherein said PVA resin dissolves when exposed to water in about 29 seconds allowing release at a predetermined height above the ground.

5. The method of claim 2 wherein said PVA resin dissolves when exposed to water in about 25 seconds allowing release at a predetermined height above the ground.

6. The method of claim 2 wherein said micron PVA resin dissolves when exposed to water in about 19 seconds allowing release at a predetermined height above the ground.

7. The cross-linked aqueous polymer of claim 1 wherein said polymer is a cross-linked modified polyacrylamides.

8. The cross-linked polymer of 1 wherein said material is between 50 and 4000 microns.

9. The method of claim 1 wherein the amount of said aqueous solidifier material needed is precalculated based upon the size of the storm and the absorption properties of said aqueous solidifier material.

10. The methods of claim 1 wherein said aqueous solidifier material is biodegradable and nonhazardous.

* * * * *